United States Patent
Fontana et al.

(10) Patent No.: US 6,237,143 B1
(45) Date of Patent: *May 22, 2001

(54) METHOD AND SYSTEM FOR MONITORING AND CAPTURING ALL FILE USAGE OF A SOFTWARE TOOL

(75) Inventors: James Albert Fontana; Anthony Reginald Pitchford; Mark Jeffrey Tadman, all of Mission Viejo, CA (US)

(73) Assignee: Unisys Corp., Blue Bell, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 11 days.

(21) Appl. No.: 09/154,613

(22) Filed: Sep. 17, 1998

(51) Int. Cl.[7] .................................................. G06F 9/45
(52) U.S. Cl. .................................................. 717/11
(58) Field of Search .................... 717/1, 11, 4; 703/23; 705/1; 707/8; 709/220, 221; 710/8; 714/1

(56) References Cited

U.S. PATENT DOCUMENTS

| | | | |
|---|---|---|---|
| 5,463,775 | * 10/1995 | Dewitt et al. | 702/186 |
| 5,506,955 | * 4/1996 | Chen et al. | 714/26 |
| 5,673,315 | * 9/1997 | Wolf | 705/59 |
| 5,684,945 | * 11/1997 | Chen et al. | 714/20 |
| 5,790,664 | * 8/1998 | Coley et al. | 709/223 |
| 5,930,798 | * 7/1999 | Lawler et al. | 707/102 |
| 5,933,604 | * 8/1999 | Inakoshi | 709/226 |
| 5,944,793 | * 8/1999 | Islam et al. | 709/220 |
| 5,953,534 | * 9/1999 | Romer et al. | 717/11 |
| 6,023,586 | * 2/2000 | Gaisford et al. | 717/11 |
| 6,049,798 | * 4/2000 | Bishop et al. | 707/10 |
| 6,052,512 | * 4/2000 | Peterson et al. | 709/220 |
| 6,154,849 | * 11/2000 | Xin | 714/4 |
| 6,163,544 | * 12/2000 | Andersson et al. | 370/42 |
| 6,167,564 | * 12/2000 | Fontana et al. | 717/1 |

OTHER PUBLICATIONS

Eisenhauser et al, "An object based infrastructure for program monitoring and steeing", SPDT ACM pp 10–20, May 1998.*

Oehlrich et al, "Performance evaluation of a communictaion system for tranputer networks based on monitored event trace", ACM pp 202–211, Sep. 1991.*

Ford:, A generic embeded real time monitor subsystem, ACM pp 312–318, May 1990.*

Martonosi et al, "The SHRIMP performance monitor: design and application", SPDT ACM pp 61–69, 1996.*

* cited by examiner

Primary Examiner—Mark R. Powell
Assistant Examiner—Anil Khatri
(74) Attorney, Agent, or Firm—Alfred W. Kozak; Mark T. Starr; Rocco L. Adornato

(57) ABSTRACT

A method is provided in a computer system, which employs a multiplicity of diverse software tools, for monitoring and capturing a pattern of all file usage of each of the software tools. The usage pattern for each of the software tools is migrated into the computer system. The method includes invoking a first process for interfacing with a first one of the software tools and the computer system. Next, the first one of the software tools is invoked through the first process inside the computer system. The first process and the first one of the software tools are then registered with a control module in the computer system. A second process is informed through the control module that the first one of the software tools is being operated upon and to start recording information about the tool. After this, the second process captures information about all files opened and closed by the first one of the software tools during its operation. The information captured in the preceding step is recorded through a third process inside the computer system logging the recorded information into a monitor file. Upon termination of operation of the software tool, the control module is requested to inform the first process to stop capturing information about the tool. Finally, the recorded information is transformed and migrated to the computer system through a fourth process.

24 Claims, 7 Drawing Sheets

METHOD AND SYSTEM FOR MONITORING AND CAPTURING ALL FILE USAGE OF A SOFTWARE TOOL

CROSS REFERENCE TO RELATED APPLICATIONS

This application relates to the following co-pending applications, assigned to the same assignee hereof, the texts of which are incorporated herein by reference.

U.S. Ser. No. 09/156,029, entitled A METHOD AND SYSTEM FOR INTERFACING TO A VARIETY OF SOFTWARE DEVELOPMENT TOOLS;

U.S. Ser. No. 09/156,028, entitled A SOFTWARE SYSTEM DEVELOPMENT FRAMEWORK;

U.S. Ser. No. 09/156,027, entitled A METHOD AND SYSTEM FOR CONTROLLING AND TRACKING CLIENT ACCESS TO SERVER SOFTWARE; and, U.S. Ser. No.09/156,026, entitled METHOD AND SYSTEM FOR BUILDING COMPONENTS IN A FRAMEWORK USEFUL IN DEVELOPING INTEGRATED BUSINESS-CENTRIC APPLICATIONS.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of computer systems; and, in particular, it relates to software for monitoring and capturing all file usage of a tool and for migrating those usage patterns into the computer system.

BACKGROUND OF THE INVENTION

In the current state of computer systems and software development, there are a wide array of tools used to perform an equally wide array of functions. To accomplish efficient execution of any application development aid deployment, it is widely recognized that there is a need to develop, within the framework of a computer system, the ability to adapt and use the right tool for solving the right problem; depending upon the tool's functionality within the context of the problem.

The ability of a computer system to adapt and use a tool inside its framework depends upon its ability to identify the resources that the tool needs to accomplish the process. Typically, such resources may include the protocol the tool uses to communicate with the system, the functions the tool needs to call from the system's library, the interfaces the tool must develop to identify a common communication platform with the system and other tools, and the files the tool must run itself and the relevant applications. The problem with integrating a tool thus opens up a multitude of complex capabilities that a computer system needs to incorporate in its framework.

Among the various factors needed to address the integration of a tool into a computer system framework as mentioned above, is the ability of a computer system to define and understand the patterns of usage of files during the process in which a tool operates to solve a particular problem (within a particular application). The files used by a tool can be broadly classified into three categories. Configuration files, registry files and data files. The configuration and registry files are usually installed in the system when the tool is used for the first time. The data files on the other hand are used for a wide variety of input/output ("I/O") operations performed by the tool every time it is used. These I/O operations may not always be native to the system and neither would be the files themselves. Hence, to integrate the tools the computer system framework should be able to understand the files used in such operations and transform them into a format native to the system. However, this transformation can best be organized if the system is able to develop capabilities transparent to both the user and the tool. That is, the system should be able to capture a particular tool and use it without modifying the tool in any way. Such an ability, when developed in a generic and open manner, would facilitate integration of tools without the need to reconfigure and manually manipulate a tool to make it accessible to the system and the application's requirements.

SUMMARY OF THE INVENTION

A method is provided in a computer system, which employs a multiplicity of diverse tools, for monitoring and capturing a pattern of all file usage of each of the software tools. The usage pattern for each of the software tools is migrated into the computer system. The method includes invoking a first process for interfacing with a first one of the software tools and the computer system. Next, the first one of said software tools is invoked through said first process inside said computer system. The first process and the first one of the software tools are then registered with a control module in the computer system. A second process is informed through the control module that the first one of the software tools is being operated upon. After this, the second process captures information about all files opened and closed by the first one of the software tools during its operation. The information captured in the preceding step is recorded through a third process inside the computer system logging the recorded information into a monitor file. Finally, the recorded information is transformed and migrated to the computer system through a fourth process.

An object of the present invention is to provide a method and system that allows transformation of the methodology of the file usage patterns of a tool into a form that is native to the computer system framework Another object of the present invention is to provide a method and system that allows a user to develop applications with the use of heterogeneous tools.

Another object of the present invention is to provide a method and system that allows use of a software development tool in heterogeneous applications and environments.

Yet another object of the present invention is to provide a method and system that overcomes the prior art limitations of integrating only those tools from the same vendor, or the lack of a functional scope for integrating newly developed tools, or the lack of tool interoperability.

An advantage of interfacing tools using the method and system of the present invention is that a standard interface for a tool can be invoked by other components of the framework without their knowledge of which tool is actually being invoked.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

The term protocol as used herein refers to a set of formal rules describing how to transmit data, especially across a network. Low-level protocols define the electrical and physical standards to be observed, bit- and byte-ordering and the transmission and error detection as well as correction of the bit stream. High-level protocols deal with message formatting, including the syntax of messages, the terminal to computer dialogue, character sets, sequencing of messages, etc.

The term schema as used herein refers to the logical description of data in a database, including definitions and relationships of data.

Figure 1:
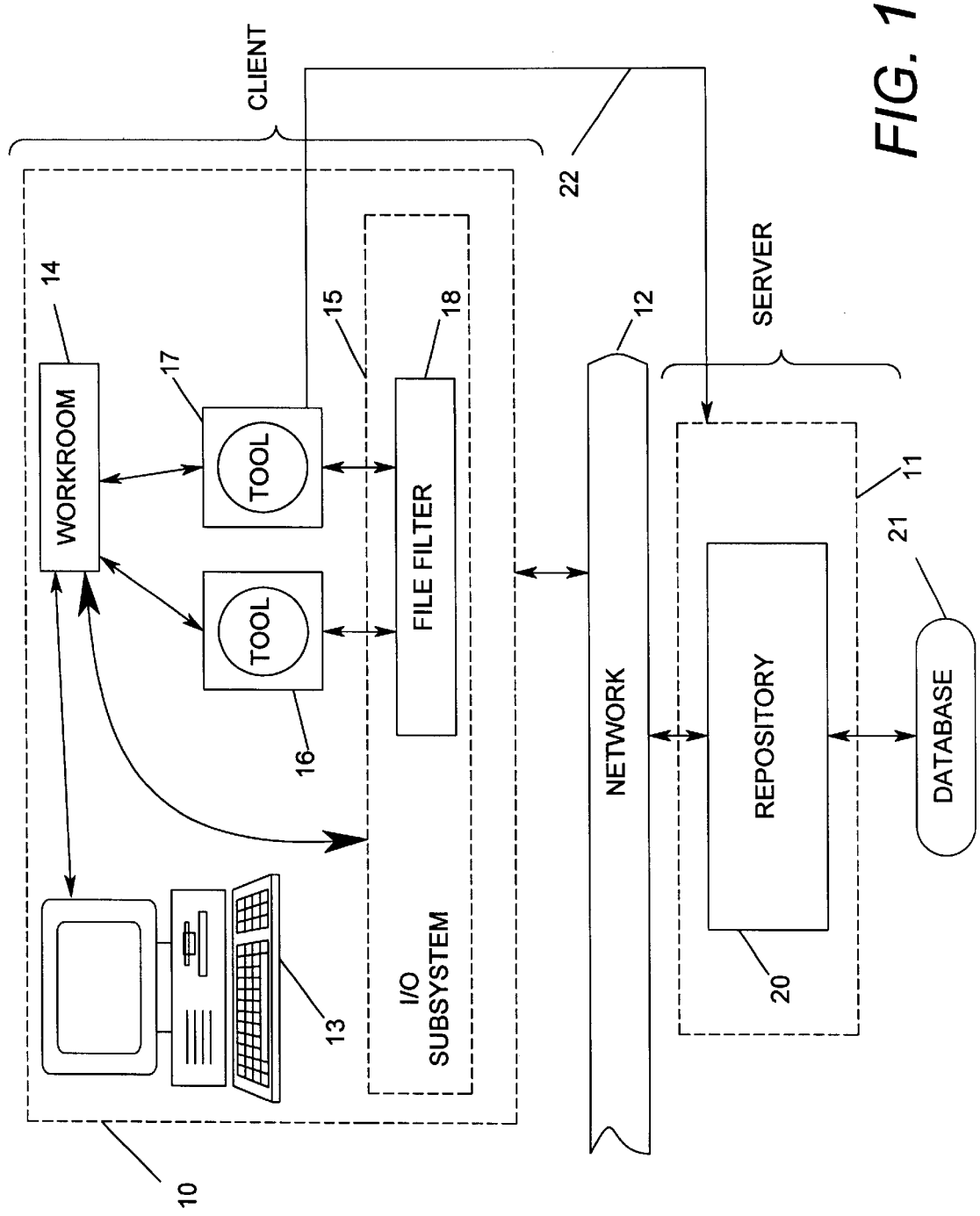
FIG. 1 is a block diagram of a computer system that may incorporate the method and system of the present invention.

Referring now to the drawings and in particular to FIG. 1, the overall architecture of a computer system employing the present invention is illustrated in block diagram form. For ease of understanding, the system is illustrated in two parts. First, there is shown a client 10 and a server 11 that communicate with one another over a network 12. The network 12 may comprise any conventional network (e.g., TCP/IP), or the Internet. It is noted that the client and server portions of the software may be executed on a single system, thereby obviating the need for the network 12.

Within the client 10, a user platform 13 is coupled to a workroom 14, which is a front end component of the computer system employing the present invention and is coupled to an I/O subsystem 15. The I/O subsystem 15 is a component of the client 10 and facilitates all input/output operations performed by any tool inside the client 10. Two examples of software tools 16 and 17 are disposed between the workroom 14 and a file filter 18 via the I/O subsystem, which is the method and system of the present invention. Note that the file filter 18 is also disposed inside the I/O Subsystem 15, which will be explained further hereinafter.

Within the server 11 is a repository 20, which is a specialized, extensible object-oriented database application that adds value to a database system. It is pointed out that the repository 20 is not an essential part of the method and system of the present invention, and is included in the description to illustrate use of the disclosed embodiment of the invention. The repository 20 allows customization of a particular function (such as application development) and is coupled to a database 21 for accessing data stored therein. Note that the tool 17 within the client 10 is coupled to the repository 20 by means of a line 22, the purpose of which will be amplified further hereinafter.

The repository 20 further includes tools for cataloging, browsing, and managing components that make up an application. Methods to support these services are disclosed in several patents and patent applications assigned to the assignee of this application, including U.S. Pat. No. 5,671,398 for METHOD FOR COLLAPSING A VERSION TREE WHICH DEPICTS A HISTORY OF SYSTEM DATA AND PROCESSES FOR AN ENTERPRISE; U.S. Pat. No. 5,644,764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992 for A METHOD FOR MAPPING TYPES IN A MODEL IN A OBJECT-ORIENTED REPOSITORY TO LANGUAGE CONSTRUCTS FOR A C BINDING FOR THE REPOSI- TORY; U.S. Pat. No. 5,721,925, for METHOD FOR GENERICALLY INVOKING OPERATIONS IN AN OBJECT ORIENTED REPOSITORY; U.S. Pat. No. 5,848,273 for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; U.S. Pat. No. 6,105,073 for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

Figure 2:
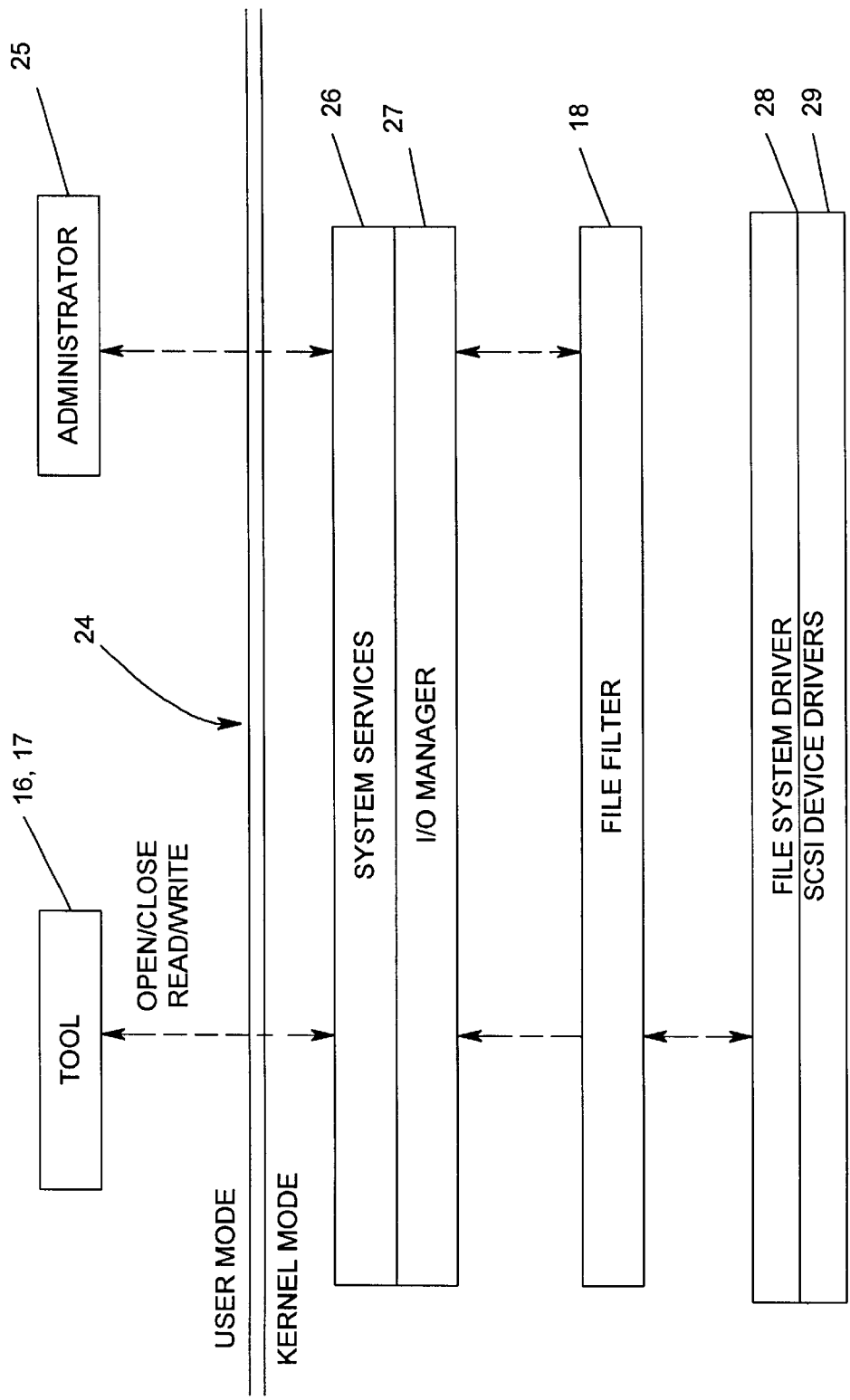
FIG. 2 is a diagram illustrating the overall architecture of the method and system of the present invention.

Referring now to FIG. 2, the overall architecture of the method and system of the present invention is illustrated. In the User Mode, which is illustrated above the double line 24, a file filter control, or Administrator 25 is a control program disposed for performing administrative and configuration control functions for the file filter 18; and, the tool 16,17 may comprise any generic software tool used inside the computer system to perform a specific function. In the Kernel Mode, which is illustrated below the double line 24, system services 26 and I/O manager 27 are typical components of a computer system used to facilitate file operations like open/close/read/write. The components 26 and 27 are well known to one skilled in the art. The file filter 18 is disposed between the I/O manager 27 and a file system driver 28. The driver 28 is also a typical component of a computer system employed for manipulation of specific files used by the tool to carry out a specific function. SCSI device drivers 29, which are disposed below the file system driver 28, are used to manipulate files stored in a disk drive of the computer system. However, the file filter 18 can interact with drivers of any other storage device, e.g. a floppy disk or a CD ROM drive in lieu of the SCSI device drivers.

The filter 18 acts as a transparent media between the I/O manager module 27 and file system driver module 28/SCSI device drivers 29. The file filter 18 is therefore able to capture all requests and responses of file usage made by the tools 16,17. This is facilitated by the fact that any file usage request and its response has to traverse the vertical path encompassing all the modules as shown in FIG. 2.

Figure 3:
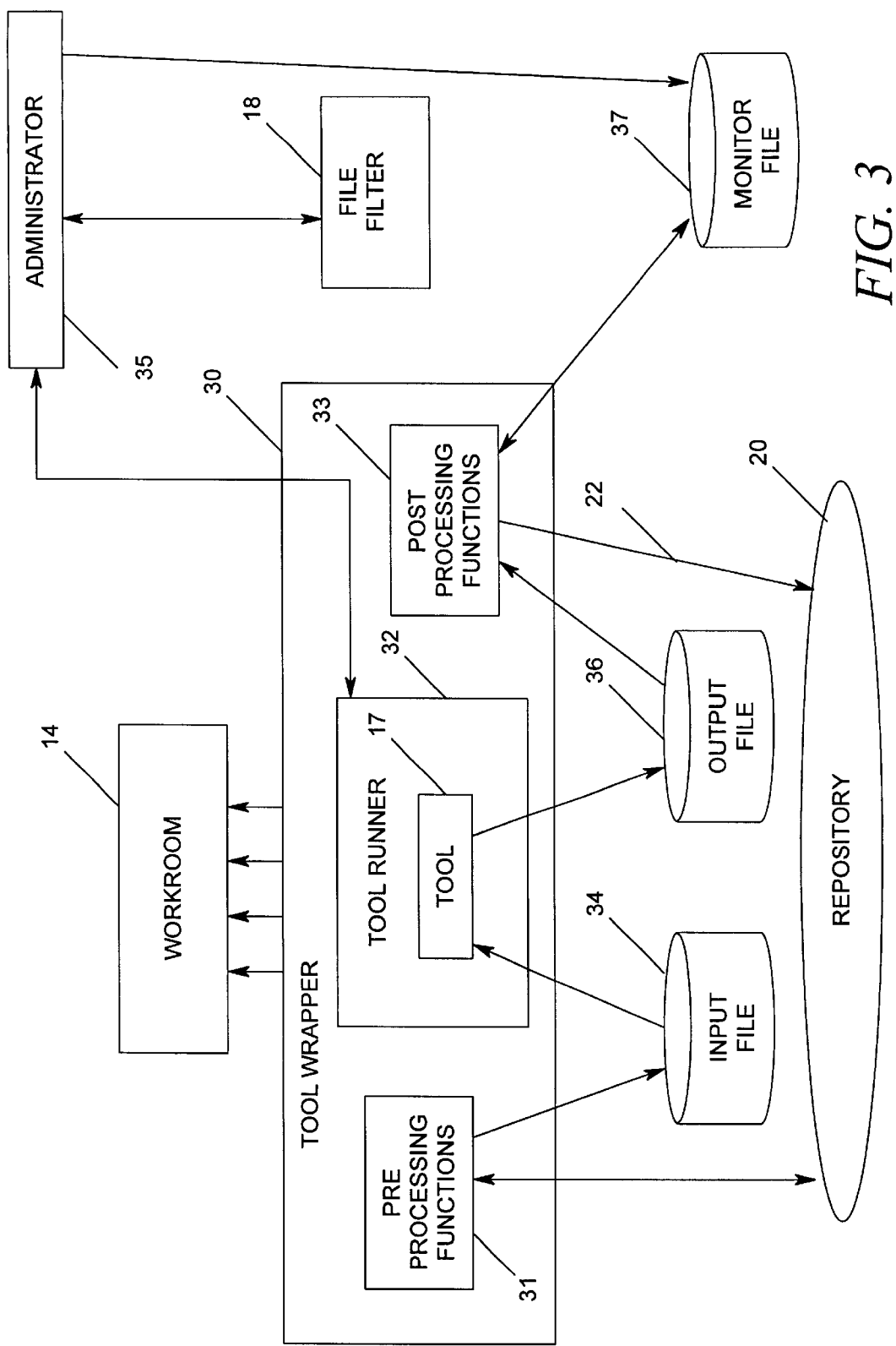
FIG. 3 is a block diagram illustrating the operation of a specific embodiment of the method and system of the present invention.

Referring now to FIG. 3, a specific embodiment of the generic architecture for operating the method and system of the present invention in a software development environment is shown. The file filter 18 is initiated by the operating system during system initialization; and, it is controlled by the Administrator 25. The tool wrapper 30 includes the tool 17, as illustrated. It is noted that a tool wrapper for the tool 16 is arranged in a like manner. The tool wrapper 30 is illustrated and explained in greater detail in the above-cited co-pending patent application Ser. No. 09/156,029 entitled A METHOD AND SYSTEM FOR INTERFACING TO A VARIETY OF SOFTWARE DEVELOPMENT TOOLS.

The functionalities of the tool wrapper 30 can be divided into three categories: a pre-processing functions module 31, a ToolRunner module 32 and a post-processing functions module 33. These three modules work together to integrate third party tools (e.g., the tools 16, 17) into the computer system framework. Each integrated tool has a wrapper 30 that incorporates the unique functionality required for the tool. The wrapper 30 is compatible with all tools used for similar purposes in the framework. The tool wrapper 30 is referred to as a generic tool wrapper, which can act as the building block for any particular tool wrapper category that the user wants to implement in the framework.

Whenever a tool is invoked inside a computer system framework having one or more tool wrappers and a repository (such as the repository 20), the pre-processing functions module 31 of that wrapper (such as the tool wrapper 30) is invoked with a respect to the file filter to monitor the tool's I/O operations. The pre-processing functions module 31 optionally communicates with the repository 20 to identify the functionalities of the category for which the tool 17 is invoked. The module 31 also retrieves the files needed for the tool 17 to operate from the database in which the files are kept, such as the database 21, FIG. 1. These files serve as an input to an application, which is operated upon by the tool 17. The ToolRunner module 32 invokes the tool 17 and executes it on an input file 34, which was provided earlier by the pre-processing functions module 31.

The module 32 also communicates with the Administrator 25, which is a software module particular to the computer system in which the tool wrapper 30 and the file filter 18 are operating. Before invoking the tool 17, the module 32 communicates a message to the Administrator 25 requesting it to invoke the file filter 18 with a request to the file filter to monitor the tool's I/O operations. The Administrator 25 then invokes the file filter driver 18 and communicates to it the details about the tool 17 and its point of inception. The file filter 18 then starts monitoring all files used as an input/output by the tool 17 and passes on this information to the Administrator 25. The Administrator then starts logging that information to a separate file called a monitor file 37. This process iterates itself until the ToolRunner module 32 informs the Administrator 25 about the ending of the tool 17's operation. The Administrator 25 passes on this message to the file filter driver 18.

The tool 17 stores its output into one or more files called output files 36. The output file 36 serves as an input to the post-processing functions module 33, which analyses the output produced as a result of running the tool 17 in conjunction with data stored in a monitor file 37. The analysis helps the computer system to identify the file usage patterns of the tool 17 and the information is then optionally stored in the repository 20.

Figure 4:
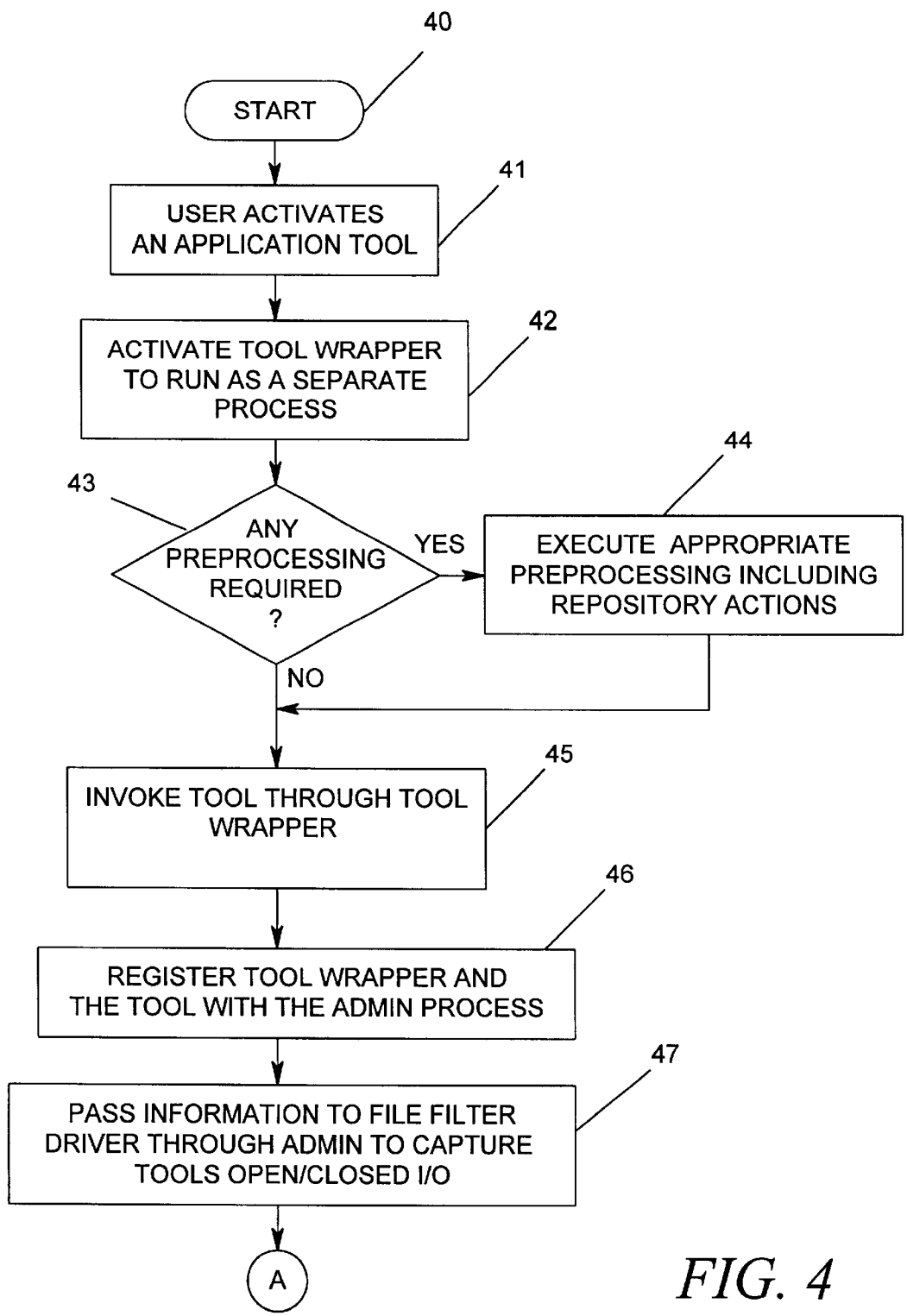
FIGS. 4 through 6 are a combined flow chart of the process of the present invention at run time.

Referring now to FIG. 4, the first of a three-sheet illustration of the flow of the method of the present invention at run time is shown. The process begins with a start bubble 40 followed by a step where a user indicates via the workroom a desire to start an application tool (block 41). Next, the tool wrapper 30 is activated to run as a separate process (block 42). Following this, an inquiry is made as to whether or not any pre-processing is required (diamond 43). If the answer to this inquiry is yes, then an appropriate pre-processing operation is executed, including repository actions (block 44).

On the other hand, if the answer to the inquiry in the diamond 43 is no, then the tool 17 is invoked through the tool wrapper 30 (block 45). Next, the tool 17 and the tool wrapper 30 are registered with an Admin process (block 46). After this, information is passed to the file filter driver 28 through the Admin process in order to capture requests by the tool for such operations as open, close or I/O (block 47). The process description continues in conjunction with FIG. 5 as depicted by a connector A.

Figure 5:
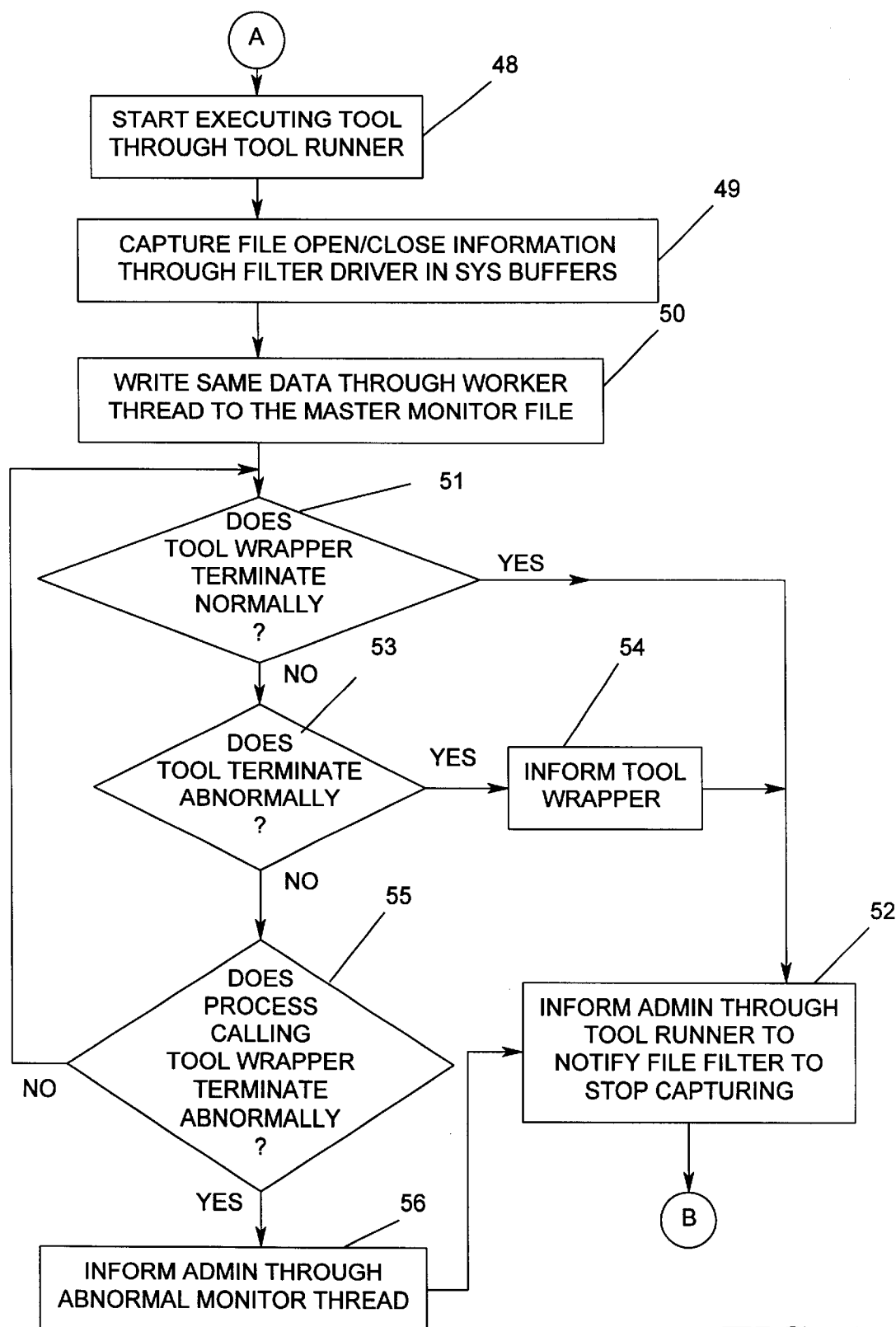

Referring now to FIG. 5 at the connector A, tool execution is started through the ToolRunner 32 (block 48). Next, file open/close information is captured through the file filter 18 in the system buffers (block 49). After this, the same data captured in the step depicted by the block 49 is retrieved by an administrator thread (i.e., worker thread, which is a connection) and written through a worker thread (which is a connection for the tool 17 with the computer system) to the master monitor file (block 50). An inquiry is next made as to whether or not the tool wrapper 30 terminates normally (diamond 51). If the answer to this inquiry is yes, then the Admin process is informed through the ToolRunner 32 to notify the file filter 18 to stop capturing information (block 52).

On the other hand, if the tool wrapper 30 does not terminate normally, then another inquiry is made as to whether or not the tool 17 terminates abnormally (diamond 53). If the answer to this inquiry is yes, then the ToolRunner 32 is informed of this fact (block 54). On the other hand, if the tool 17 does not terminate abnormally, yet another inquiry is made as to whether or not the ToolRunner 32 terminates abnormally (diamond 55). If the answer to this inquiry is no, then a return is made back to the diamond 51 for a new set of inquiries.

If the tool 17 does not terminate normally (diamond 51), nor does it terminate abnormally (diamond 53), but the ToolRunner 32 terminates abnormally (diamond 56), then the Admin process is informed of this fact through an abnormal monitor thread (which is a connection between the tool and the computer system). Next, the Admin process is informed through the ToolRunner 32 to notify the file filter 18 to stop capturing information (block 52). The process description continues in conjunction with FIG. 6 as depicted by a bubble B.

Figure 6:
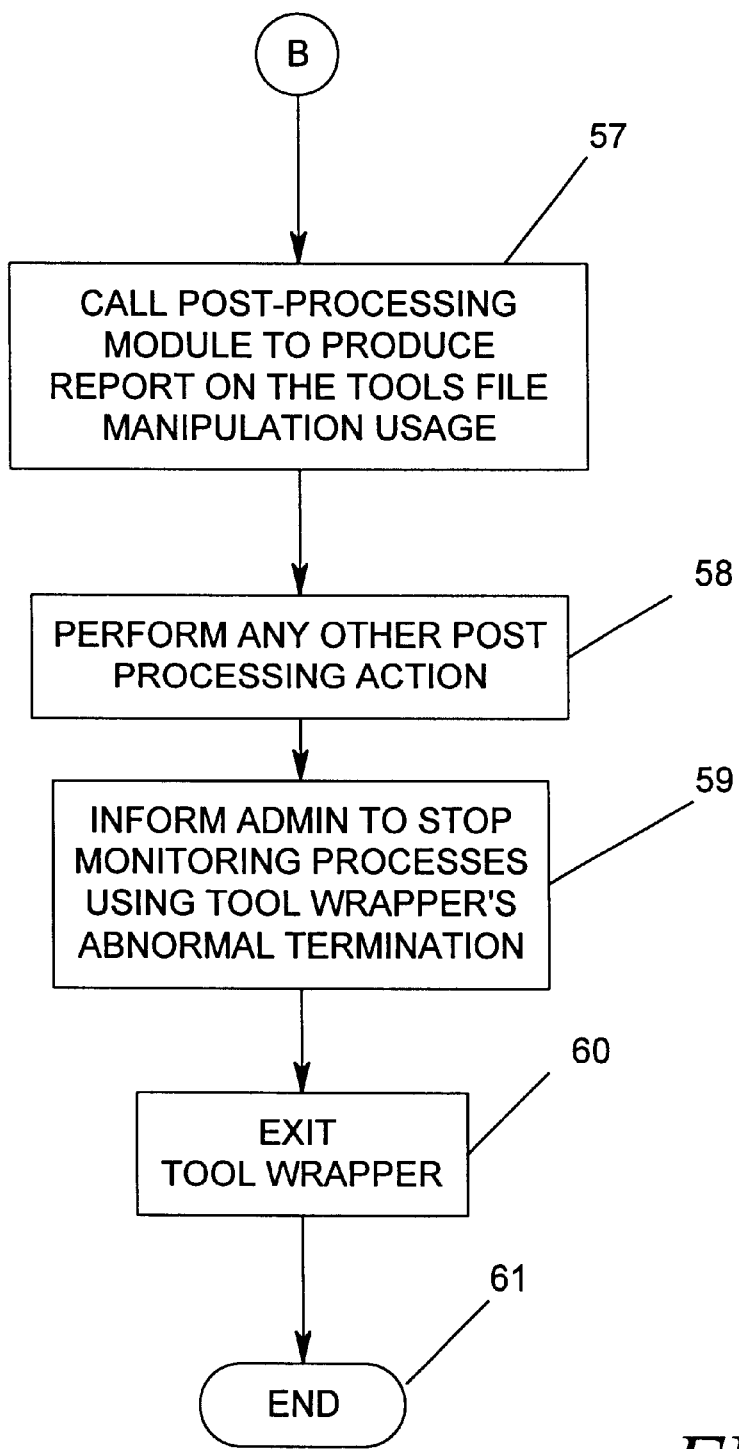

Referring now to FIG. 6 at the bubble B, the file filter post-processing module 33 is called through the ToolRunner 32 to produce a report on the tools file manipulation usage (block 57). Next, any other post-processing action is performed (block 58). After this, the Admin process is informed to stop monitoring the tool wrappers abnormal termination (block 59). Finally, the ToolRunner 32 exits (block 60) and the process ends (bubble 61).

Figure 7:
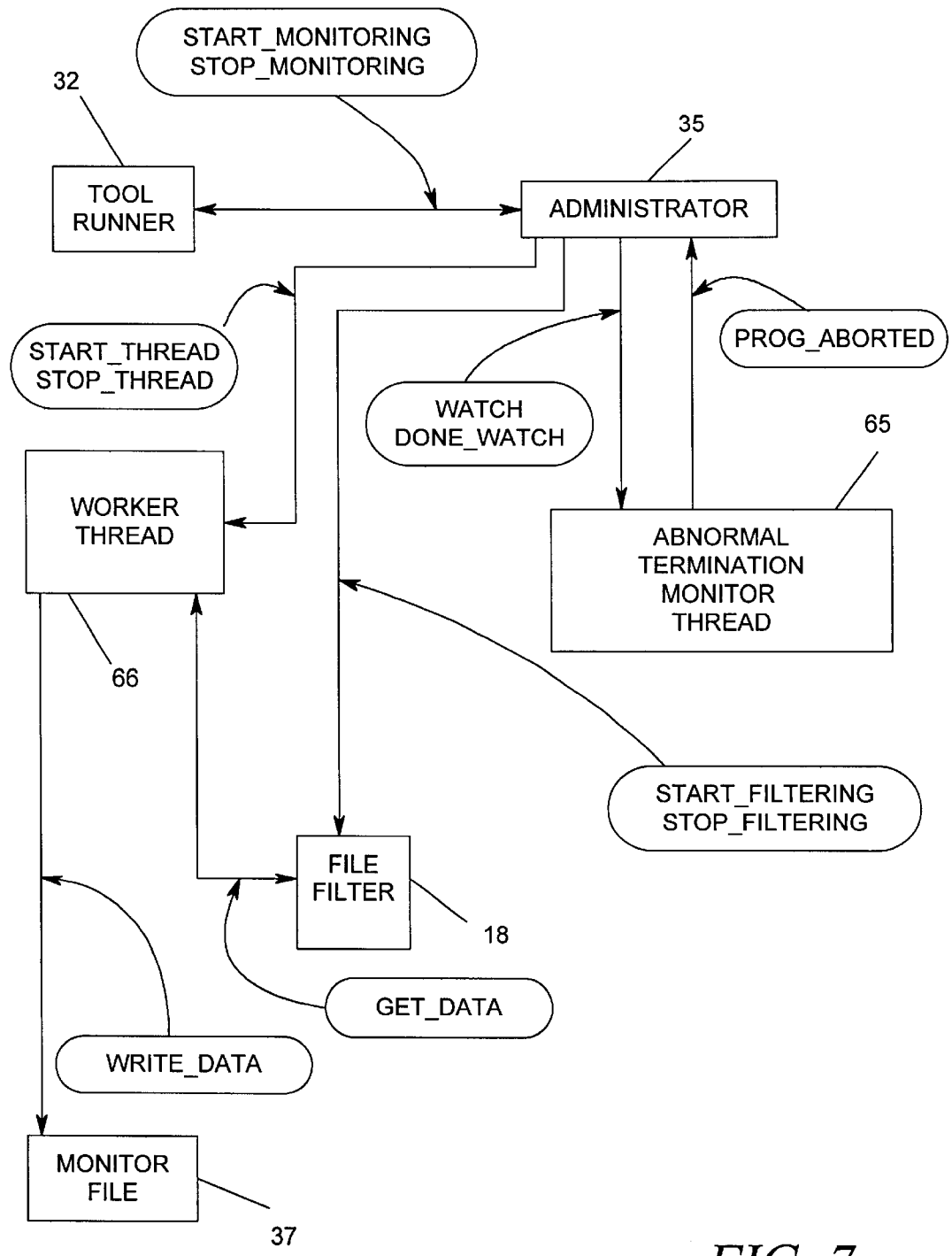
FIG. 7 is a block diagram illustrating the application interfaces to the method and system of the present invention.

Referring now to FIG. 7, a block diagram illustrating the functionalities embedded in the method and system of the present invention is shown. START_MONITORING is a method used by the tool wrapper 30 to call the file filter software through the Administrator 25. The method directs the file filter software to start monitoring the input/output operations performed by the tool 17. The method uses the process ID's of the tool wrapper 30 and the tool 17 to identify the same.

STOP_MONITORING is a method used by the tool wrapper 30 to call the file filter software through the Administrator 25. The method directs the file filter software to stop monitoring the input/output operations performed by the tool 17. The method uses the process ID's of the tool wrapper 30 and the tool 17 to identify the same. The Administrator 25 communicates with an abnormal monitor thread module 65 through the methods WATCH and DONE_WATCH. The methods WATCH and DONE_WATCH direct the abnormal termination monitor thread module 65 to begin and end monitoring the tool 17 in order to detect its abnormal termination. The method uses the tool process ID for identification. If an abnormal termination of the tool 17 is detected the abnormal termination monitor thread module 65 uses the method PROG_ABORTED to report it to the Administrator 25. The PROG_ABORTED method also uses the tools ID for identification. The Administrator 25 communicates with the file filter 18 through two methods; START_FILTERING and STOP_FILTERING. The START_FILTERING method activates the file filter 18 while the STOP_FILTERING method deactivates the file filter 18.

The worker thread 66 is a stand alone component built inside the file filter functionality framework that reads data from the file filter 18 and records it into the monitor file 37. It is initiated and stopped by the Administrator 25 through the two methods START_THREAD and STOP_THREAD, respectively. The methods act to create and destroy an object, which is referred to as the worker thread 66. The worker thread 66 reads data captured by the file filter 18 through the method GET_DATA. The method GET_DATA uses a buffer as a parameter to record the captured data. The worker thread 66 writes the recorded data into the monitor file 37 through the method WRITE_DATA>.

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system employing a multiplicity of diverse tools, a method for monitoring and capturing a pattern of all file usage of each of said software tools and migrating said usage pattern for each of said software tools into said computer system, said method comprising the steps of:

a. invoking a first process for interfacing with a first one of said software tools and said computer system;
   b. invoking said first one of said software tools through said first process inside said computer system;
   c. registering said first process and said first one of said software tools with a control module in said computer system;
   d. informing a second process through said control module that said first one of said software tools is being operated upon and to start recording information about it;
   e. said second process capturing information about all files opened and closed by said first one of said software tools during its operation;

f. recording the information captured in the preceding step through a third process inside said computer system logging said recorded information into a monitor file;

g. upon termination of operation of said first one of said software tools, informing said control module to notify said first process to stop capturing information for said tool; and, h. transforming and migrating said recorded information in a form native to said computer system through a fourth process for the purpose of extracting file open/close information.

2. The method as in claim 1 wherein said first process is a tool wrapper disposed for interfacing to software tools.

3. The method as in claim 1 wherein said step of registering said first process further comprises the steps of:

a. receiving a request from a tool runner to start monitoring operation of said tool;

b. sending control messages to said file filter driver; and, c. receiving control information from said tool wrapper.

4. The method as in claim 3 further comprising sending information to a tool wrapper thread to start watching for an abnormal termination of said tool.

5. The method as in claim 3 further comprising receiving information from a tool wrapper thread when said program was aborted.

6. The method as in claim 1 further comprising sending information to a tool wrapper thread to start watching for an abnormal termination of said tool and receiving information from said tool wrapper thread when said program was aborted.

7. The method as in claim 1 wherein said second process comprises file filter driver disposed for monitoring selected input/output operations.

8. In a computer system employing a multiplicity of diverse tools, a method for monitoring and capturing a pattern of all file usage of each of said software tools and migrating said usage pattern for each of said software tools into said computer system, said method comprising the steps of:

a. during the process of invoking but prior to actually invoking a tool through a tool wrapper, registering said tool and said tool wrapper with an administrator process;

b. passing information to a file filter driver through said administrator process in order to initiate capturing operations of said tool;

c. while said tool is being executed, capturing file open/close information through a filter driver using system buffers of said computer system;

d. writing said file open/close information to a master monitor file;

e. upon termination of operation of said tool, informing said administrator process to notify said file filter to stop capturing information for said tool; and, f. transforming and migrating said file open/close information from said master monitor file to a post processing function within said first process.

9. The method as in claim 8 after the step of writing said file open/close information further comprising the steps of determining if said tool terminates normally, and if yes, informing said administrator process to notify said file filter to stop capturing information for said tool.

10. The method as in claim 9 where said tool does not terminate normally further comprising the steps of determining if said tool terminates abnormally, and if yes, informing said tool wrapper of this fact and informing said administrator process to notify said file filter to stop capturing information for said tool.

11. The method as in claim 10 wherein said tool does not terminate normally and does not terminate abnormally, further comprising the steps of determining if process call said tool wrapper terminates abnormally, and if yes, informing said administrator process through an abnormal monitor thread, and informing said administrator process to notify said file filter to stop capturing information for said tool.

12. The method as in claim 11 wherein said tool wrapper does not terminate normally and does not terminate abnormally and the process calling said tool wrapper does not terminate abnormally, further comprising the step of repeating all of the steps in claim 11.

13. A program storage device readable by a machine, tangibly embodying a program of instructions executable by the machine to perform method steps for monitoring and capturing a pattern of all file usage of each of a multiplicity of software tools employed by said machine and migrating said usage pattern for each of said software tools into said machine, said method steps comprising:

a. invoking a first process for interfacing with a first one of said software tools and said computer system;

b. invoking said first one of said software tools through said first process inside said computer system;

c. registering said first process and said first one of said software tools with a control module in said computer system;

d. informing a second process through said control module that said first one of said software tools is being operated upon and to start recording information abut it;

e. said second process capturing information about all files opened and closed by said first one of said software tools during its operation;

f. recording the information captured in the preceding step through a third process inside said computer system logging said recorded information into a monitor file;

g. upon termination of operation of said first one of said software tools, informing said control module to notify said first process to stop capturing information for said tool; and, h. transforming and migrating said recorded information in a form native to said computer system through a fourth process for the purpose of extracting open/close information.

14. The program embodied in the programmable storage device as in claim 13 wherein said first process is a tool wrapper disposed for interfacing to software tools.

15. The program embodied in the programmable storage device as in claim 13 wherein said step of registering said first process further comprises the steps of:

a. receiving a request from a tool runner to start monitoring operation of said tool;

b. sending control messages to said file filter driver; and, c. receiving control information from said tool wrapper.

16. The program embodied in the programmable storage device as in claim 15 further comprising sending information to a tool wrapper thread to start watching for an abnormal termination of said tool.

17. The program embodied in the programmable storage device as in claim 15 further comprising receiving information from a tool wrapper thread when said program was aborted.

18. The program embodied in the programmable storage device as in claim 13 further comprising sending information to a tool wrapper thread to start watching for an abnormal termination of said tool and receiving information from said tool wrapper thread when said program was aborted.

19. The program embodied in the programmable storage device as in claim 13 wherein said second process comprises file filter driver disposed for monitoring selected input/output operations.

20. A storage medium encoded with machine-readable computer program code for monitoring and capturing a pattern of all file usage of each of a multiplicity of software tools, wherein, when the computer program code is executed by a computer, the computer performs the steps of:
   a. during the process of invoking but prior to actually invoking a tool through a tool wrapper, registering said tool and said tool wrapper with an administrator process;
   b. passing information to a file filter driver through said administrator process in order to initiate capturing operations of said tool;
   c. while tool is being executed, capturing file open/close information through a filter driver using system buffers of said computer system;
   d. writing said file open/close information to a master monitor file;
   e. upon termination of operation of said tool, informing said administrator process to notify said file filter to stop capturing information for said tool; and,
   f. transforming and migrating said file open/close information from said master monitor file to a post processing function within said first process.

21. The storage medium as in claim 20 after the step of writing said file open/close information further comprising the steps of determining if said tool terminates normally, and if yes, informing said administrator process to notify said file filter to stop capturing information for said tool.

22. The storage medium as in claim 21 where said tool does not terminate normally further comprising the steps of determining if said tool terminates abnormally, and if yes, informing said tool wrapper of this fact and informing said administrator process to notify said file filter to stop capturing information for said tool.

23. The storage medium as in claim 22 wherein said tool does not terminate normally and does not terminate abnormally, further comprising the steps of determining if process call said tool wrapper terminates abnormally, and if yes, informing said administrator process through an abnormal monitor thread, and informing said administrator process to notify said file filter to stop capturing information for said tool.

24. The storage medium as in claim 23 wherein said tool wrapper does not terminate normally and does not terminate abnormally and the process calling said tool wrapper does not terminate abnormally, further comprising the step of repeating all of the steps in claim 23.

* * * * *